United States Patent
Im et al.

(10) Patent No.: US 8,060,080 B2
(45) Date of Patent: Nov. 15, 2011

(54) APPARATUS AND METHOD FOR PROVIDING POWER OFF INFORMATION IN PORTABLE COMMUNICATION SYSTEM

(75) Inventors: Serk-Sun Im, Suwon-si (KR); Sung-Hoon Moon, Suown-si (KR)

(73) Assignee: Samsung Electronics Co., Ltd (KR)

( * ) Notice: Subject to any disclaimer, the term of this patent is extended or adjusted under 35 U.S.C. 154(b) by 858 days.

(21) Appl. No.: 12/001,790

(22) Filed: Dec. 11, 2007

(65) Prior Publication Data
US 2008/0214187 A1    Sep. 4, 2008

(30) Foreign Application Priority Data
Dec. 11, 2006    (KR) .......................... 10-2006-0125519

(51) Int. Cl.
*H04B 7/00*    (2006.01)

(52) U.S. Cl. ..................................... 455/425; 455/435.1
(58) Field of Classification Search ............... 455/67.11, 455/414.1, 423, 425, 533, 434, 435.1, 550.1, 455/574
See application file for complete search history.

(56) References Cited

U.S. PATENT DOCUMENTS

| | | | |
|---|---|---|---|
| 6,345,180 B1 * | 2/2002 | Reichelt ......................... | 455/574 |
| 6,397,061 B1 * | 5/2002 | Jordan et al. ................... | 455/574 |
| 7,027,843 B2 * | 4/2006 | Cromer et al. ................. | 455/574 |
| 2004/0242286 A1 * | 12/2004 | Benco et al. ................... | 455/574 |
| 2005/0170853 A1 * | 8/2005 | Verma et al. ................... | 455/433 |

* cited by examiner

*Primary Examiner* — Thanh Le
(74) *Attorney, Agent, or Firm* — The Farrell Law Firm, P.C.

(57) ABSTRACT

Provided is an apparatus and method for providing power-off information in a portable communication system. The portable communication system for identifying information on a destination terminal in a power-off state includes a portable terminal and a Mobile Switching Center (MSC).

11 Claims, 5 Drawing Sheets

APPARATUS AND METHOD FOR PROVIDING POWER OFF INFORMATION IN PORTABLE COMMUNICATION SYSTEM

PRIORITY

This application claims priority under 35 U.S.C. §119(a) to an application filed in the Korean Intellectual Property Office on Dec. 11, 2006 and assigned Serial No. 2006-125519, the contents of which are incorporated herein by reference.

BACKGROUND OF THE INVENTION

1. Field of the Invention

The present invention relates generally to an apparatus and method for informing a state of a portable terminal, and in particular, to an apparatus and method for informing an originator having attempted a telephony connection to a portable terminal that powers off because of a battery power shortage that the portable terminal is in a power-off state caused by the battery power shortage.

2. Description of the Related Art

In recent years, portable terminals, a necessity to modern people, are being used without age and sex distinctions. Service providers and terminal manufacturers are competitively developing products and services to differentiate from other enterprises.

For example, portable terminals are evolving into multimedia equipments, providing functions such as a phone book, a game, a short message service, an electronic mail (e-mail), a morning or wake-up call, a Moving Picture Experts Group (MPEG)-1 Audio Layer 3 (MP3), a digital camera, and radio broadcast listening, and provide a variety of services.

A portable terminal may be in a situation that a terminal's power is off according to a user's conditions or the power is off because of a battery consumption resulting from a use of supplementary functions.

If another user sends a request for a telephony connection to a destination that is powered-off by the above reason, an originator determines that the telephony connection is disabled through a voice guide (e.g., phone is in off state, etc.) provided to the portable terminal.

However, the originator receiving such a voice guide cannot check under what situation the destination terminal powers off, and therefore, there occurs a drawback in that the originator might keep attempting a telephony connection.

Accordingly, in order to provide a solution to this drawback, a demand for an apparatus and method for forwarding a cause of a power-off (e.g., a battery power shortage, etc.) to an originator intending for a telephony connection to the portable terminal is being made.

SUMMARY OF THE INVENTION

An aspect of the present invention is to substantially solve at least the above problems and/or disadvantages and to provide at least the advantages below. Accordingly, an aspect of the present invention is to provide an apparatus and method for identifying a cause of a power-off of a destination terminal in an originating terminal.

Another aspect of the present invention is to provide an apparatus and method for, when identifying a situation that a measured battery voltage in a portable terminal is less than a predefined voltage, notifying a home location register the status of the battery.

A further aspect of the present invention is to provide an apparatus and method for, upon receiving a request for a call connection from an originator, checking a home location register and checking an operation state of a destination terminal.

The above aspects are achieved by providing an apparatus and method for providing power-off information in a portable communication system.

According to one aspect of the present invention, there is provided a portable communication system for identifying information on a destination terminal in a power-off state. The system includes a portable terminal and a Mobile Switching Center (MSC). Upon checking that a battery voltage of a portable terminal is less than a predefined threshold value, the portable terminal forwards information to the MSC, notifying the MSC that the portable terminal can power-off because of the low battery voltage. Upon receipt of the information from the portable terminal, the MSC registers that a battery voltage of the portable terminal is in a low state in a Home Location Register (HLR).

According to another aspect of the present invention, there is provided a method for registering information corresponding to a battery voltage in a portable terminal. The method includes measuring the battery voltage of the portable terminal and comparing the measured battery voltage with a predefined threshold value. The method also includes, when activating a power-off guide mode for registering a situation that a battery of the portable terminal is deficient in an HLR and checking that the measured battery voltage is less than a predefined threshold value, forwarding information (state=1) to an MSC, notifying the MSC that there is a possibility that the portable terminal can power-off because of the low battery voltage.

According to a further aspect of the present invention, there is provided a method for checking a state of a destination terminal in a destination MSC. The method includes, upon receipt of a request for a call connection, checking whether the destination terminal intended for the call connection is in a power-off state, and upon checking that the destination terminal is in the power-off state, checking whether the destination terminal powers off because of low battery voltage.

According still another aspect of the present invention, there is provided a method for identifying information on a destination terminal in a power-off state in a portable communication system. The method includes, upon checking that a battery voltage of the portable terminal is less than a predefined threshold value, forwarding an MSC information notifying that a portable terminal can power-off because of low battery voltage, and registering that the battery voltage of the portable terminal is in a low state in an HLR, when the MSC receives the information from the portable terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Below terms, which are defined considering functions in the present invention, can be different depending on user and operator's intention or practice. Therefore, the terms should be defined on the basis of the disclosure throughout this specification.

An apparatus and method for identifying that a destination terminal powers off because of a battery power shortage in an originating terminal sending a request for a call connection will be described below.

In the following description, a power-off guide mode refers to an operation mode of a portable terminal for registering a situation that a battery of the portable terminal is deficient in a Home Location Register (HLR) when a battery voltage of the portable terminal is smaller than a predefined threshold value. The power-off guide mode can be enabled according to a user's setup.

In other words, in a case where a user deactivates the power-off guide mode, information (state=0) notifying that an operation mode is not the power-off guide mode is forwarded to a Mobile Switching Center (MSC), even when the battery voltage of the portable terminal is smaller than a predefined threshold value.

Figure 1:
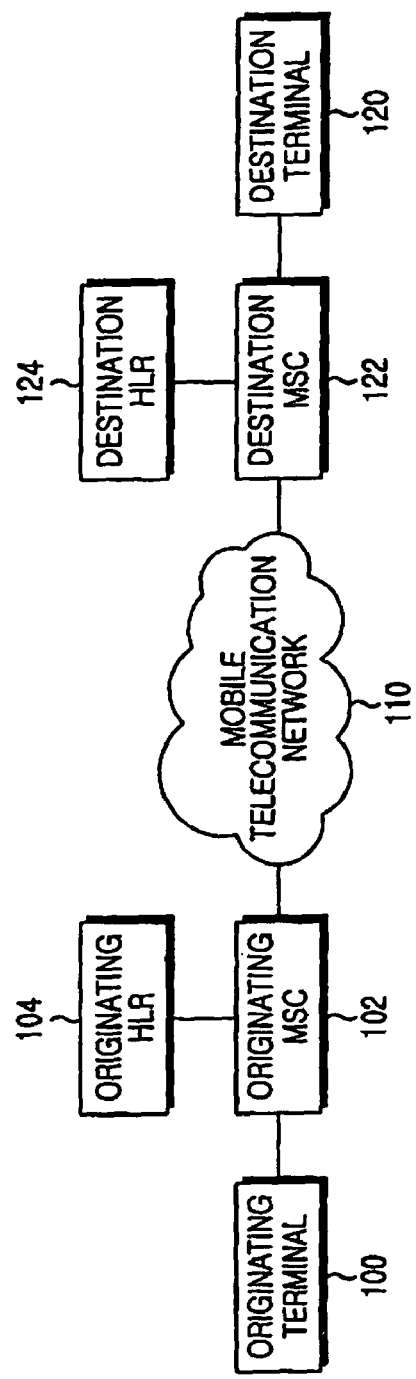
FIG. 1 is a block diagram illustrating architecture of a portable communication system according to the present invention.

FIG. 1 is a diagram illustrating a procedure for call processing in a portable communication system according to the present invention.

Referring to FIG. 1, if operating in a power-off guide mode, a destination terminal 120 forwards a destination MSC 122 information notifying the destination MSC 122 that the destination terminal 120 operates in the power-off guide mode.

Upon receipt of the information from the destination terminal 120, the destination MSC 122 connects with a destination Home Location Register (HLR) 124 and registers the received information in the destination HLR 124.

Upon occurrence of a call connection event, an originating terminal 100 connects with an originating MSC 102 via a base station (not shown). The originating MSC 102 connects with an originating HLR 104 for registering a position and a state of the originating terminal 100.

The destination terminal 120 connects with the destination MSC 122 via a base station (not shown). The destination MSC 122 connects with the destination HLR 124 for registering a position and a state of the destination terminal 120.

The destination MSC 122 checks the destination HLR 124 and checks whether the destination terminal 120 powers off. The destination MSC 122 checks whether the destination terminal 120 has operated in a power-off guide mode when checking that the destination terminal 120 powers off.

In other words, the destination MSC 122 checks whether the destination terminal 120 is in a power-off state due to a battery power shortage.

When the destination MSC 122 checks that the destination terminal 120 has powered-off while operating in the power-off guide mode, destination MSC 122 informs an originator that the destination terminal 120 has powered-off while operating in the power-off guide mode.

Accordingly, a user using the originating terminal 100 can receive a guide message indicating that the destination terminal 120 has powered off because of a battery power shortage, and a call connection is disabled.

Figure 2:
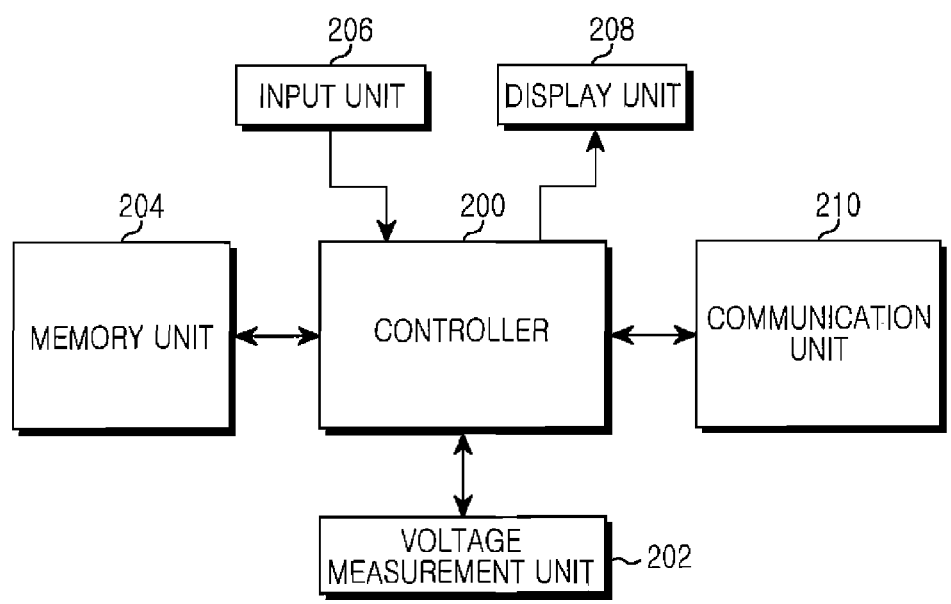
FIG. 2 is a block diagram illustrating architecture of a portable terminal according to the present invention.

FIG. 2 is a block diagram illustrating the architecture of a portable terminal according to the present invention. The portable terminal signifies the inclusion of all mobile communication terminals such as a cellular phone, a Personal Communication System (PCS), a Personal Digital Assistant (PDA), an International Mobile Telecommunications-2000 (IMT-2000) phone, and a 4-Generation (4G) broadband system phone. The following description will be made with a general construction.

Referring to FIG. 2, the portable terminal can include a controller 200, a battery voltage measurement unit 202, a memory unit 204, an input unit 206, a display unit 208, and a communication unit 210.

The controller (a Micro-Processor Unit (MPU)) 200 controls a general operation of the portable terminal. For example, the controller 200 performs a process and a control for voice telephony and data communication. In addition to general functions, the controller 200 controls the battery voltage measurement unit 202 to measure a voltage of the portable terminal, forwards information to an MSC, notifying the MSC of an operation mode of the portable terminal corresponding to the measured voltage, and processes and registers the information in an HLR according to the present invention.

In other words, the controller 200 processes and registers an operation mode of the portable terminal, which operates in a power-off guide mode, in the HLR when the measured voltage is smaller than a predefined threshold value.

The battery voltage measurement unit 202 measures the battery voltage of the portable terminal under the control of the controller 200 and provides the measured battery voltage to the controller 200.

The memory unit 204 is comprised of a Read Only Memory (ROM), a Random Access Memory (RAM), and a flash ROM. The ROM stores a micro-code of a program for controlling the controller 200 and the battery voltage measurement unit 206 and various kinds of reference data.

The RAM, a working memory of the controller 200, stores temporary data generated during an execution of all programs in the portable terminal. The flash ROM stores each variety of updateable safekeeping data such as a phone book, an incoming message, and an outgoing message. The flash ROM includes a battery voltage table defining an operation corresponding to the measured battery voltage according to the present invention.

The input unit 206 includes numeral key buttons '0' through '9', a menu button, a cancel button (delete), an okay button, a talk button, an end button, an Internet button, navigation key (or direction key) buttons, and a plurality of function keys such as a character input key. The input unit 206 provides key input data associated with a key pressed by user to the controller 200.

The display unit 208 displays status information generated in execution of the portable terminal, a limited number of characters, and a large amount of moving pictures and still pictures. The display unit 208 can use a color Liquid Crystal Display (LCD).

The communication unit 208 exchanges a radio signal of data input/output through an antenna (not shown). For example, in a transmission mode, the communication unit 208 processes data to be transmitted by channel coding and spreading, processes the data by Radio Frequency (RF), and transmits the RF-processed data. In a reception mode, the communication unit 208 converts a received RF signal into a baseband signal, processes the baseband signal by de-spreading and channel decoding, and restores the processed signal to original data.

The controller 200 can perform a function of the battery voltage measurement unit 202. However, these are separately constructed and shown in order to distinguish and describe respective functions in the present invention. Thus, when a product is actually realized, the product can be also constructed for the controller 200 to process all of the respective functions.

The above description has been made for an apparatus for identifying that a destination terminal powers off because of a battery power shortage in an originating terminal sending a request for call connection. A method for identifying that a destination terminal powers off because of a battery power shortage in an originating terminal sending a request for a call connection, using the apparatus will be described below.

Figure 3:
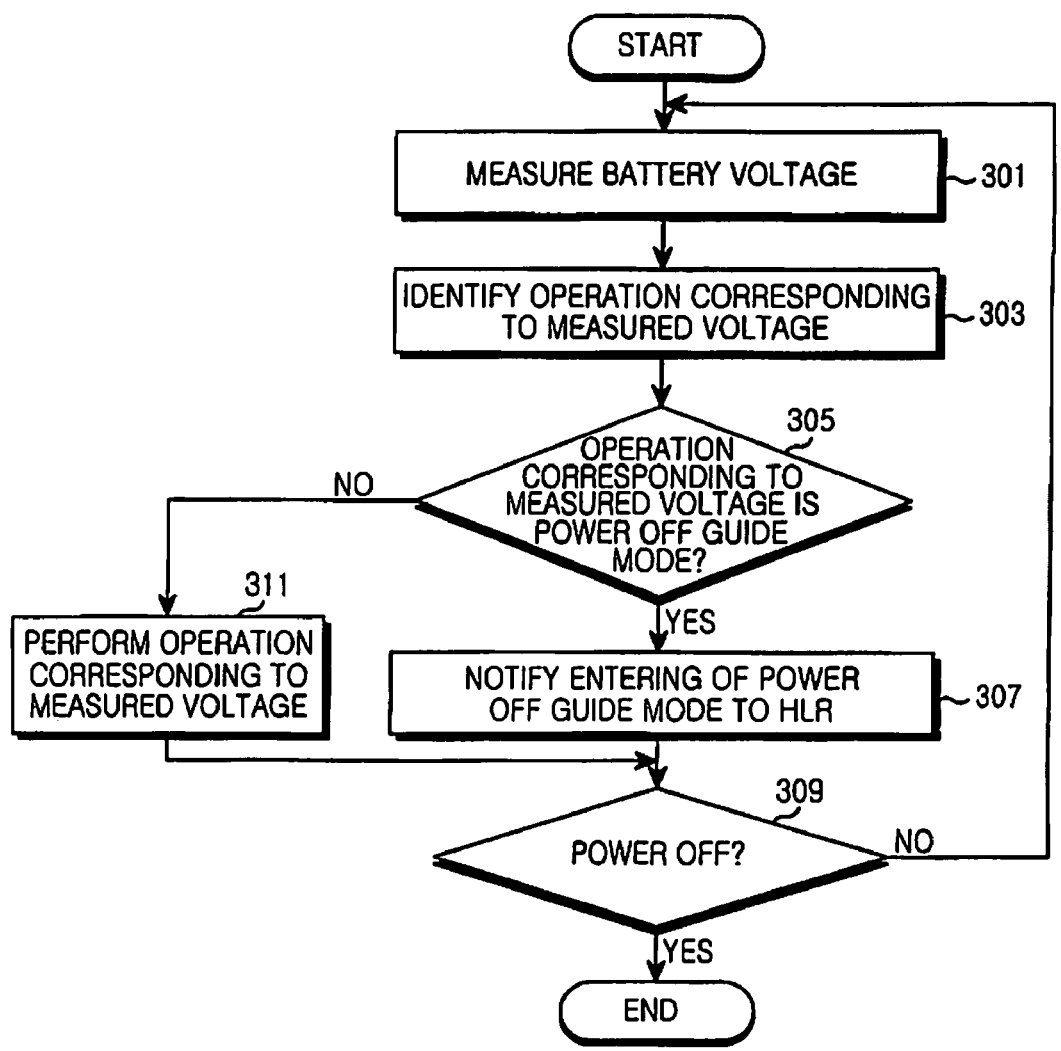
FIG. 3 is a flowchart illustrating a procedure for setting an operation mode corresponding to a battery voltage in a portable terminal according to the present invention.

FIG. 3 is a flowchart illustrating a procedure for setting an operation mode corresponding to a battery voltage in a portable terminal according to the present invention. A description for FIG. 3 will be made on the assumption that a user of the portable terminal activates a power-off guide mode.

Referring to FIG. 3, in Step 301, a controller 200 controls a battery voltage measurement unit 202 to measure a battery voltage of the portable terminal. In Step 303, the controller 200 identifies an operation mode of the portable terminal corresponding to the measured battery voltage.

The operation mode corresponding to the measured battery voltage can be identified using a battery voltage table such as an example defined in Table 1 below.

TABLE 1

| | Operation mode |
|---|---|
| 4.0 V | Display all battery indicators |
| 3.8 V | Display two battery indicators |
| 3.5 V | Display one battery indicator |
| 3.4 V | Power-off |

In Step 305, the controller 200 checks whether the operation mode is a power-off guide mode, in which if the portable terminal powers off, a notification is forwarded to an originator.

The power-off guide mode can be identified through a comparison between the measured battery voltage and a predefined threshold value. In other words, the controller 200 can determine that the portable terminal enters the power-off guide mode when the measured battery voltage is smaller than a predefined threshold value.

The predefined threshold value can be set within a range (e.g., 3.4 V to 3.5 V) within which the portable terminal can perform a minimal operation.

In Step 311, the controller 200 performs an operation corresponding to the operation mode and then, processes and registers the operation mode in an HLR, when checking that the identified operation mode is not the power-off guide mode. For example, the controller 200 displays an amount of remaining battery power on a display unit 208 and then, processes and registers information (state=0) notifying that the operation mode is not the power-off guide mode in the HLR.

For example, in a case where the battery voltage is equal to 3.8 V, the controller 200 displays two battery indicators on the display unit 208 and then, forwards the information (state=0) to an MSC, notifying the MSC that the operation mode is not the power-off guide mode.

In Step 307, the controller 200 processes and registers the identified operation mode in the HLR when checking that the identified operation mode is the power-off guide mode.

For example, in a case where the battery voltage is equal to 3.5 V and the predefined threshold value is equal to 3.6 V, the controller 200 checks that the battery voltage is smaller than the predefined threshold value, determines that the operation mode enters the power-off guide mode, and forwards information (state=1) to the MSC, notifying the MSC that the operation mode is the power-off guide mode.

Here, in a case where the power-off guide mode is deactivated by a user, the controller 200 forwards the information (state=0) to the MSC, notifying the MSC that the operation mode is not the power-off guide mode.

In Step 309, the controller 200 checks whether the portable terminal powers off. If checking that the portable terminal does not power-off, the controller 200 repeatedly performs the Step 301.

If the controller determines that the portable terminal powers off, the controller 200 terminates the present algorithm.

A description of a situation where the portable terminal powers off because of a battery power shortage has been made with reference to FIG. 3. However, when there occurs a situation that the call is terminated by the user in a low battery state, the user can select a desired guide comment among a set of given guide comments for disabling the telephony connection generally and select another guide comment for disabling the connection due to a battery power shortage.

Figure 4:
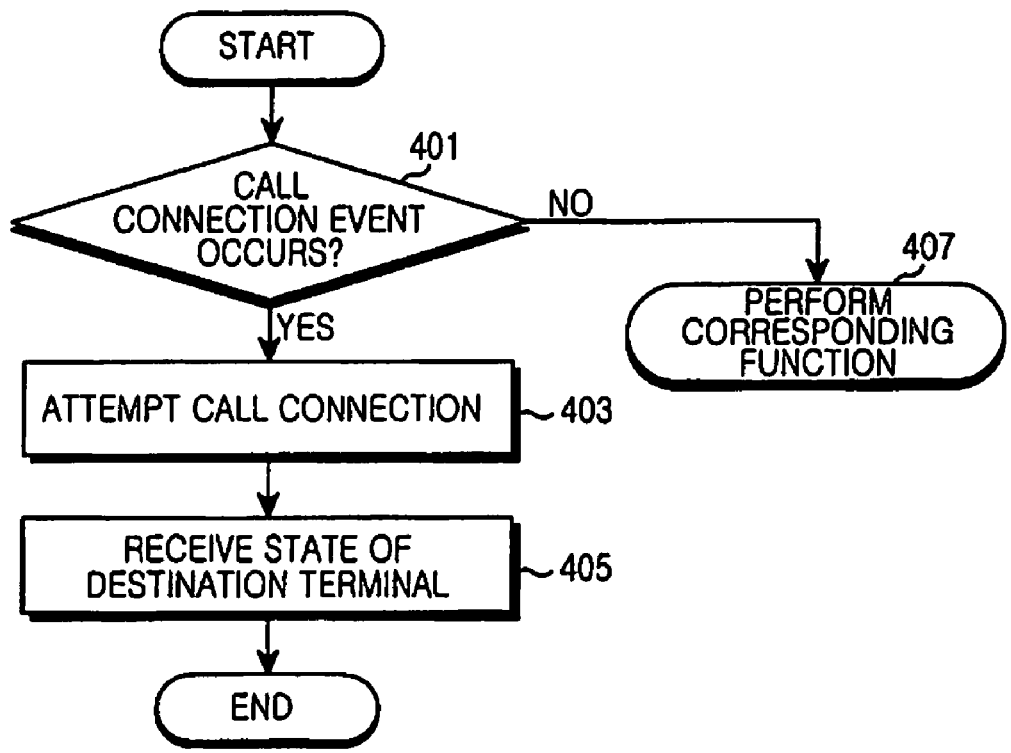
FIG. 4 is a flowchart illustrating a procedure for attempting a call connection in a portable terminal according to the present invention.

FIG. 4 is a flowchart illustrating a procedure for attempting a call connection in a portable terminal according to the present invention.

Referring to FIG. 4, in Step 401, an originating terminal 100 checks whether there is a call connection request by a user.

In Step 407, the originating terminal 100 performs a corresponding function (e.g., an idle mode) upon checking that there is not a call connection request.

In Step 403, the originating terminal 100 attempts a call connection upon checking that there is a call connection request.

A call connection is performed through an originating MSC 102. The originating MSC 102 can connect with a destination MSC 122 via a mobile telecommunication network 110 and perform the call connection.

In Step 405, the originating terminal 100 receives information concerning a state of a destination terminal 120 from the destination MSC 122, after attempting the call connection.

The information about the state of the destination terminal 120 received from the destination MSC 122 includes a connection sound notifying a user of the originating terminal that the destination terminal 120 is under call connection and a guide sound notifying the user that the destination terminal 120 powers off. Further, the information about the state of the destination terminal 120 can include a guide sound notifying that the destination terminal 120 is in a power-off state caused by battery power shortage according to the present invention.

Next, the originating terminal 100 terminates the present algorithm.

Figure 5:
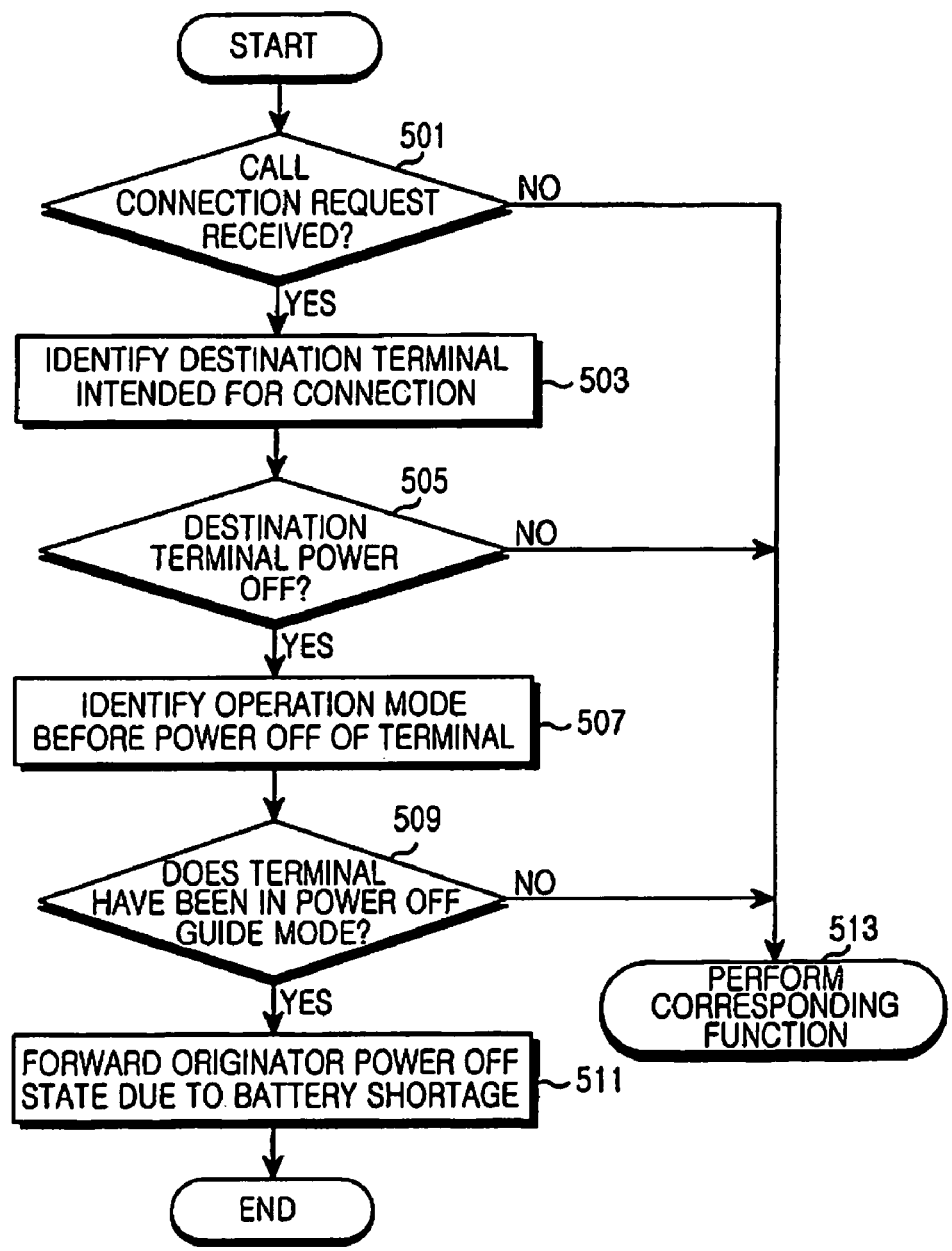
FIG. 5 is a flowchart illustrating a procedure for checking a state of a portable terminal in a destination mobile switching center according to the present invention.

FIG. 5 is a flowchart illustrating a procedure for checking a state of a portable terminal in a destination MSC according to the present invention.

Referring to FIG. 5, in Step 501, the destination MSC 122 checks whether the destination MSC 122 receives a call connection request from an originating MSC 102. In Step 513, upon checking that the destination MSC 122 does not receive a call connection request, the destination MSC 122 performs a corresponding function (e.g., an idle mode).

In Step 503, upon receiving a call connection request, the destination MSC 122 identifies a destination terminal 120 to which an originating terminal 100 intends to connect. In Step 505, the destination MSC 122 checks whether the destination terminal 120 is in a power-off state.

In Step 513, upon checking that the destination terminal 120 is not in the power-off state, the destination MSC 122 performs a corresponding function (e.g., a telephony connection for the destination terminal).

In Step 509, upon checking that the destination terminal 120 is in the power-off state, the destination MSC 122 checks a state before power-off of the destination terminal 120.

In detail, the destination MSC 122 identifies an operation mode of the destination terminal 120 stored in an HLR 124 and checks whether the destination terminal 120 powers off in a power-off guide mode. In Step 513, upon checking that the destination terminal 120 does not power-off in the power-off guide mode, the destination MSC 122 performs a corresponding function (e.g., forwarding a destination that telephony connection is disabled).

In Step 511, upon checking that the destination terminal 120 powers off in the power-off guide mode, the destination MSC 122 forwards information to an originator, notifying the originator that the destination terminal 120 powers off because of a battery power shortage.

Next, the destination MSC 122 terminates the present algorithm.

As described above, a portable terminal according to the present invention registers information notifying a battery of the portable terminal is deficient in an HLR when measuring a battery voltage smaller than a predefined threshold value. By doing so, when attempting a call connection to the destination terminal having powered-off because a of battery power shortage, a user of an originating terminal can identify that a destination terminal powers off because of a battery power shortage.

Alternate embodiments of the present invention can also comprise computer readable codes on a computer readable medium. The computer readable medium includes any data storage device that can store data that can be read by a computer system. Examples of a computer readable medium include magnetic storage media (such as Read Only Memory (ROM), floppy disks, and hard disks, among others), optical recording media (such as Compact Disk (CD)-ROMs or Digital Versatile Disks (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication system for identifying information on a destination terminal in a power-off state, the system comprising:
   a portable terminal for, upon checking that a battery voltage of the portable terminal is less than a predefined threshold value, forwarding a Mobile Switching Center (MSC) information notifying the MSC that the portable terminal can power-off because of a low battery voltage; and
   the MSC for, upon receipt of the information from the portable terminal, registering the information that the battery voltage of the portable terminal is in a low state in a Home Location Register (HLR),
   wherein upon receipt of a request for a call connection, when checking the HLR and identifying the power-off state of the destination terminal intended for the call connection, the MSC checks whether the destination terminal is in the power-off state because of the low battery voltage:
   wherein when checking that the destination terminal is in the power-off state because of the low battery voltage, the MSC forwards information to an originating MSC, notifying the originating MSC that the call connection with the destination terminal cannot be performed because of the low battery voltage; and
   wherein the originating MCS sends a message to the originating terminal, indicating that the destination terminal is in the power-off state because of the low battery voltage and the call connection is disabled.

2. The system of claim 1, wherein the portable terminal comprises:
   a voltage measurement unit for measuring the battery voltage of the portable terminal under a control of a controller; and
   the controller for, upon checking that the measured battery voltage is less than a predefined threshold value, forwarding information (state=1) to the MSC, notifying the MSC that there is a possibility that the portable terminal will power-off because of the low battery voltage.

3. The system of claim 2, wherein according to a user's selection, the controller activates or deactivates a power-off guide mode for registering a situation that a battery of the portable terminal is deficient in a Home Location Register (HLR).

4. The system of claim 3, wherein when the power-off guide mode is deactivated and checking that the measured battery voltage is less than a predefined threshold value, the controller processes and forwards information (state=0) to the MSC, notifying the MSC that there is no possibility that the portable terminal powers off because of the low battery voltage, to the HLR.

5. A method for registering information corresponding to a battery voltage in a portable terminal, the method comprising:
   measuring the battery voltage of the portable terminal and comparing the measured battery voltage with a predefined threshold value; and
   when activating a power-off guide mode for registering a situation that a battery of the portable terminal is deficient in an HLR and checking that the measured battery voltage is less than the predefined threshold value, forwarding information (state=1) to an MSC, notifying the MSC that the portable terminal can power-off because of a low battery voltage.

6. The method of claim 5, further comprising when deactivating the power-off guide mode and checking that the measured battery voltage is less than a predefined threshold value, forwarding the MSC information (state=0), notifying the MSC that there is not a possibility that the portable terminal will power-off because of a low battery voltage.

7. A method for checking a state of a destination terminal in a destination MSC, the method comprising:

upon receipt of a request for a call connection, checking whether the destination terminal intended for the call connection is in a power-off state; and upon checking that the destination terminal is in the power-off state, checking whether the destination terminal is in the power-off state due to a low battery voltage.

8. The method of claim 7, further comprising when checking that the destination terminal is in the power-off state due to the low battery voltage, forwarding information to an originating MSC, notifying the originating MSC that the call connection is disabled since the destination terminal is in the power-off state because of the low battery voltage.

9. A method for identifying information on a destination terminal in a power-off state in a portable communication system, the method comprising:

when checking that a battery voltage of the portable terminal is less than a predefined threshold value, forwarding information to an MSC, notifying the MSC that a portable terminal can power-off because of a low battery voltage; and when the MSC receives the information from the portable terminal, registering that the battery voltage of the portable terminal is in a low state in a Home Location Register (HLR), wherein upon receipt of a request for a call connection, when checking the HLR and identifying the power-off state of the destination terminal intended for the call connection, the MSC checks whether a destination terminal is in the power-off state because of the low battery voltage;

wherein when checking that the destination terminal is in the power-off state because of the low battery voltage the MSC forwards information to an originating MSC, notifying the originating MSC that the call connection with the destination terminal cannot be performed because of the low battery voltage; and wherein the originating MCS sends a message to the originating terminal, indicating that the destination terminal is in the power-off state because of the low battery voltage and the call connection is disabled.

10. The method of claim 9, wherein according to a user's selection, the portable terminal can activate or deactivate a power-off guide mode for registering a situation that the battery of the portable terminal is deficient in an HLR.

11. The method of claim 10, wherein when the power-off guide mode is deactivated and checking that the measured battery voltage is less than the predefined threshold value, the portable terminal processes and forwards information (state=0) to the MSC, notifying the MSC that there is no possibility that the portable terminal powers off because of the low battery voltage.

* * * * *